United States Patent [19]
Lovett

[11] 3,846,901
[45] Nov. 12, 1974

[54] METHOD OF MOUNTING A RESILIENT SLEEVE ON A CONVEYOR ROLLER

[76] Inventor: John R. Lovett, 23604 Lake Rd., Bay Village, Ohio 44140

[22] Filed: Apr. 19, 1973

[21] Appl. No.: 352,485

Related U.S. Application Data

[60] Division of Ser. No. 216,847, Jan. 10, 1972, abandoned, which is a continuation-in-part of Ser. No. 43,349, June 4, 1970, abandoned.

[52] U.S. Cl. .................. 29/450, 29/235, 29/234
[51] Int. Cl. ............................................. B23p 11/02
[58] Field of Search ........... 198/230; 29/450, 235, 29/148.4 D, 234, 451

[56] References Cited
UNITED STATES PATENTS

| | | | |
|---|---|---|---|
| 284,050 | 8/1883 | Nichols | 29/234 UX |
| 710,817 | 10/1902 | Stevens | 29/234 |
| 2,498,357 | 2/1950 | Breisch | 29/450 |
| 2,628,709 | 2/1953 | Steinmetz | 198/230 |
| 2,645,004 | 7/1953 | Dorner | 29/450 |
| 2,721,601 | 10/1955 | Spencer | 29/450 UX |
| 3,138,859 | 6/1964 | Edwards | 29/450 |
| 3,139,677 | 7/1964 | Goldstein | 29/451 |
| 3,212,177 | 10/1965 | Thomas | 29/235 |
| 3,269,730 | 8/1966 | Miller et al. | 29/450 X |
| 3,611,536 | 10/1971 | Guenther et al. | 29/148.4 D X |

*Primary Examiner*—Charlie T. Moon
*Attorney, Agent, or Firm*—Isler & Ornstein

[57] ABSTRACT

A resilient tubular sleeve of elastomeric material having integral outwardly projecting ribs thereon to provide a replaceable surface for a conveyor roller. The ribs have intermittent contact with the conveyor belt in response to axial rotation of the roller to cause deformation of the belt and removal of adherent materials. The tubular sleeve has a smaller internal diameter, in its un-stressed condition, than the diameter of the roller on which it is mounted. The tubular sleeve is mounted on the roller by expanding its internal diameter sufficiently to permit it to slide axially along the roller to the desired position and thereafter permitting it to contract upon the roller surface and resiliently grip it. Convenient mounting methods for the tubular sleeve have been devised utilizing fluid under pressure to effect the expansion of the tubular sleeve.

1 Claim, 6 Drawing Figures

INVENTOR.
JOHN R. LOVETT
BY
ATTORNEYS.

METHOD OF MOUNTING A RESILIENT SLEEVE ON A CONVEYOR ROLLER

This is a division of application Ser. No. 216,847 filed Jan. 10, 1972, now abandoned which is a continuation of application Ser. No. 43,349 filed June 4, 1970, now abandoned.

BACKGROUND OF THE INVENTION

Powered or gravity operated endless flexible belt conveyors are widely used for the movement of bulk materials from one location to another. The endless belt is trained over head rollers at the ends of the conveyor structure and is also provided with intermediate support rollers and idler rollers along the span of the belt between the head rollers.

The nature of the materials handled by such belt conveyors, such as sand, gravel, coal, cement, sulfur or other granular materials, often have a tendency to cling or adhere to the surface of the belt or become encrusted thereon, particularly when there are conditions of high humidity, dampness, snow, rain or freezing.

This adherent material is carried on the surface of the return flight of the belt as this surface engages and rides upon the underlying support or idler rollers. The adherent material is frequently highly abrasive and, under moist conditions, may also be highly corrosive. This causes abrasion and unnecessary, accelerated wear on the metal rollers as well as on the belt itself.

The encrusted material diminishes the flexibility of the belt and can cause it to crack if the layer of material is not eventually removed. Under freezing conditions when ice formation occurs, the flexibility of the belt is frequently diminished to the point where the conveyor is completely inoperative and cannot be used.

In order to alleviate this condition, special idler rollers have been designed which, in lieu of having a smooth cylindrical surface or periphery, have transverse rods, helical patterns or other projections welded thereto for contact with the return flight of the belt to shake or break the adherent material loose from the belt surface. Some of the designs are reasonably effective in accomplishing their purpose, whereas others are relatively ineffectual. Such welded steel idler rollers are considerably more costly than the smooth-surfaced cylindrical idler rollers. When they eventually are worn down, the entire roller must be replaced at this relatively high cost. Furthermore, as these steel rods or helixes start wearing down, the wear surface forms sharp knife edges which bite into and cut the surface of the flexible belt, thus shortening its useful life.

SUMMARY OF THE INVENTION

The invention overcomes the above-recited disadvantages of prior art devices and effectively solves the problem of belt-adhering material encrustations, by providing a replaceable sleeve of tubular form which can be readily slipped over the surface of the cylindrical steel roller and will resiliently grip the roller. The tubular sleeve is made of a durable resilient elastomer, such as a natural or synthetic rubber, having good wear-resistant characteristics and being substantially impervious to corrosion.

The tubular sleeve is provided with integral outwardly extending breaker projections for intermittently contacting and deforming the belt to cause adherent material to break away and be removed from the surface of the belt. The ribs or breaking projections of the sleeve are themselves resilient and capable of flexing under load, so that the sleeve is self-cleaning. The flexing action of the resilient projections prevents the accumulation of bulk material in the spaces between the projections and causes it to break off and be discharged by the same principle of flexing action as is utilized for breaking the adherent material away from the surface of the conveyor belt.

When the tubular sleeve has worn to a point where replacement is required, only the relatively inexpensive sleeve itself needs to be replaced to provide a new wear surface on the existing roller. The cost involved in such replacement is approximately one-fifth of the cost involved in replacing other forms of specially designed breaker rollers.

By utilizing the resiliency of the tubular sleeve to affix the sleeve to the roller body, the cost and inconvenience of clamps or other forms of fastening means or devices is eliminated. Satisfactory affixation of the sleeve to the roller is obtained by utilizing a sleeve having a somewhat smaller diameter than that of the roller on which it is to be mounted. For ease and convenience in mounting the sleeve on the roller, a procedure is disclosed which utilizes fluid pressure for expanding the sleeve so that it can slide axially relatively to the roller for mounting purposes.

The sleeve itself is economically manufactured as a one-piece compression molding or as an extrusion, so that both its initial cost and its replacement cost is far below that of any existing devices which are intended to accomplish a similar purpose.

Figure 1:
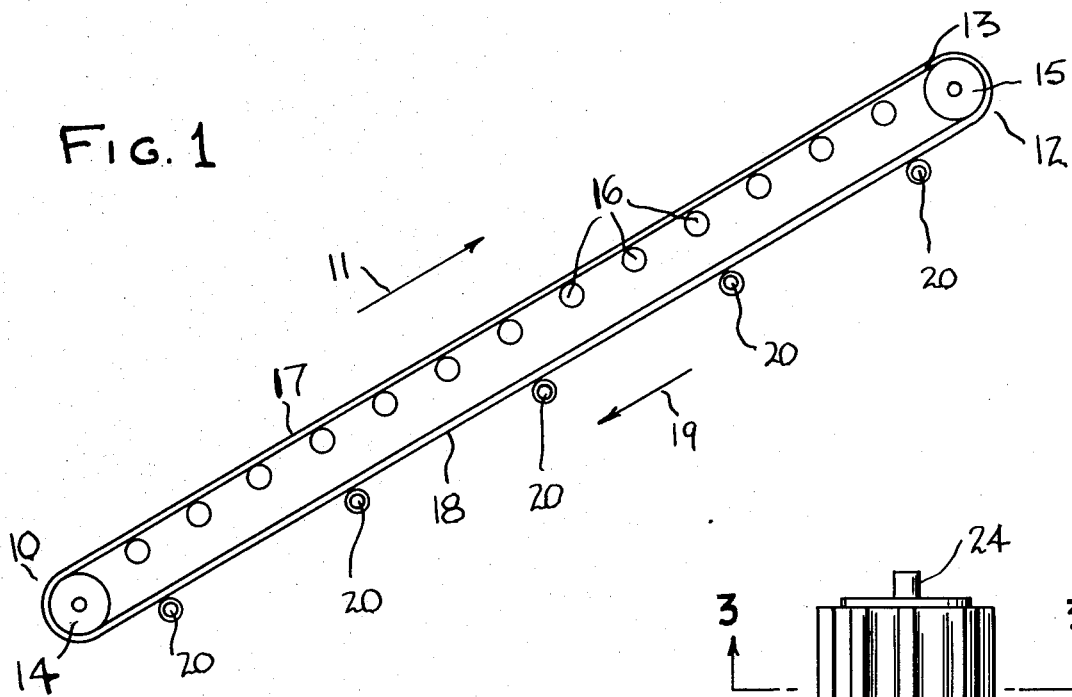
FIG. 1 is a schematic representation of a belt conveyor showing the manner of utilization of the support and idler rollers.

For clarity of illustration, wall thicknesses and other dimensional characteristics of the structures shown in the drawings have been purposely exaggerated in certain aspects.

DESCRIPTION OF THE PREFERRED EMBODIMENTS

Referring more particularly to the drawings, FIG. 1 is a schematic representation of a conventional belt conveyor apparatus for transporting bulk material or the like from a loading point or station 10 in the direction of the arrow 11 to a discharge point or station 12. One of the stations may be at a different elevation than the other of the stations, as for example the discharge station 12 may be at a higher elevation than the loading station 10.

The movement or transfer of the material is accomplished by an endless flexible belt 13 which is trained over spaced head rollers 14 and 15. Customarily, one of the head rollers, such as the roller 14, is powered from a suitable source to provide the drive for the endless belt 13, and the other head roller, such as the head roller 15, may be an adjustable idler roller.

A series of support rollers 16 are suitable journalled in the conveyor structure so as to underlie the upper or load-carrying flight 17 of the belt in the span of the belt which lies intermediate the head rollers 14 and 15. The rollers 17 may be idler rollers or they may be powered.

When the conveyed material has been discharged at the station 12, the unloaded portion of the belt, as represented by the return flight 18 of the belt, moves in a direction opposite that of the upper flight, as indicated by the direction of the arrow 19. Another series of idler rollers 20 are journalled for rotation so as to underlie the return flight 18 and be in contact with this portion of the belt 13 to maintain suitable tension on the belt and support the return flight against sagging. The idler rollers 20 are conventionally cylindrical or tubular elements of steel or similar rigid material whose periphery or circumference remains in contact with the moving return flight of the belt.

As the bulk materiais transported in the direction indicated by the arrow 11 and discharges at the station 12, some of the material will cling to or adhere to the load carrying surface of the belt 13 and will remain on the surface of the return flight 18 that comes into contact with the idler rollers 20. The extent of this adherence and the frequency of its occurence will depend upon the characteristics of the material being conveyed, as well as environmental conditions, dampness, temperature and the like. As the adherent material contacts the surface of the idler rollers 20 an abrasive action occurs which causes undue wear on both the belt and the rollers to the detriment of each. Additionally, as the adherent material is compressed between the belt and the surface of the roller 20, it tends to build up into a successively thicker and harder layer to a point where it can restrict the flexibility of the belt or cause it to run off the roller or otherwise make the conveyor inoperative.

Figure 3:
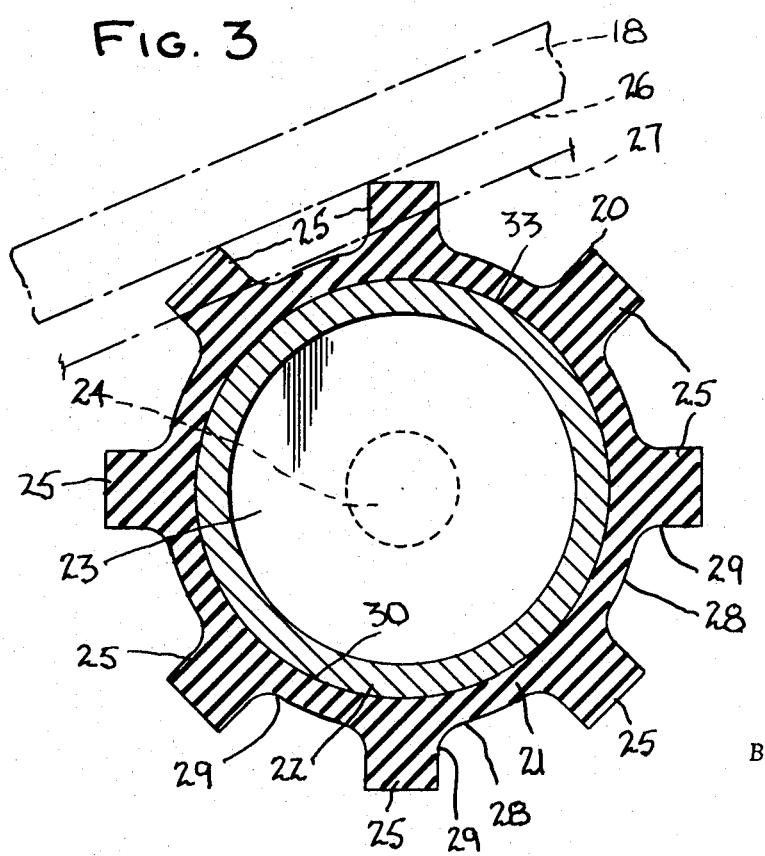
FIG. 3 is an enlarged cross-sectional view, taken as indicated on line 3—3 of FIG. 2.
Figure 2:
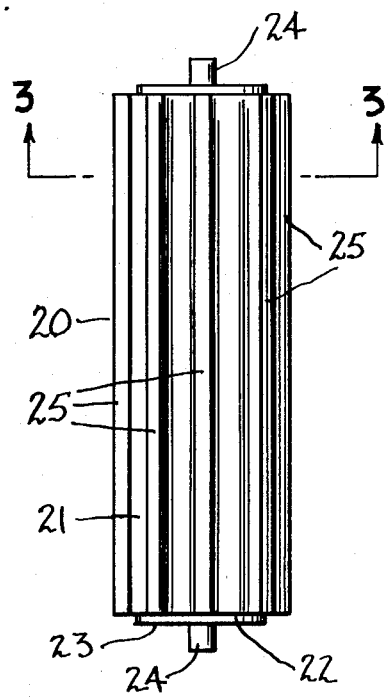
FIG. 2 is a plan view of a conveyor roller provided with a replaceable roller surface embodying the features of my invention.

As shown in FIGS. 2 and 3 of the drawings, a replaceable tubular sleeve 21 made of rubber or other resilient elastomer is mounted on the body 22 of the roller 20 to serve as a wear surface and provide a breaker roller for preventing the accumulation of adherent material on the surface of the return flight 18 of the endless belt. For purposes of illustration, both the tubular sleeve 21 and the roller body 22 are shown as being of circular cross-section as this is the most common form of roller configuration. However, there may be circumstances where a roller body 22 of rectangular or elliptical or other cross-sectional configuration may be desired or required, and in such instances the tubular sleeve 21 would be manufactured in a cross-sectional configuration which would substantially conform or be adaptable to the cross-sectional configuration of the roller on which it is to be mounted. The roller body itself may be solid or may be hollow or tubular as illustrated. When it is tubular, the body 22 is ordinarily provided with end plates 23 affixed thereto on which are welded or otherwise secured axially extending stub axles or shafts 24 for mounting the roller for rotation in the conveyor structure.

The resilient tubular sleeve 21 is provided with a series of peripherally-spaced breaker projections or ribs 25 which are preferably integral with the tubular sleeve and which extend outwardly therefrom for engagement or contact with the surface of the return flight 18 of the belt. To be most effective in dislodging the adherent material from the surface of the belt, it is desirable that the projections or ribs 25 have a height and spacing which are correlated so that the plane of belt contact defined by adjacent ribs 25, as indicated at 26, is outwardly of the parallel plane indicated at 27 and defined by a tangent to the surface 28 of the sleeve intermediate the adjacent ribs. If the projections 25 do not have a sufficient height or if the circumferential or peripheral spacing between adjacent projections is too great, the belt will be afforded opportunity to ride upon or rest upon the intermediate surfaces 28 so that the breaker action of the projections 25 will be less effective and occur with lesser frequency than is desirable. On the other hand, if the ribs 25 are spaced too closely to each other, the contact between the projections 25 and the return flight 18 becomes substantially continuous rather than intermittent and there is not that periodic deformation of the surface of the return flight 18 which is most effective to dislodge the adherent material. For similar reasons, it is desirable and preferable that the ribs 25 extend substantially axially of the sleeve 21 so that the contact of the projection 25 with the surface of the belt is substantially instantaneous and intermittent along an entire transverse section of the belt.

Ordinarily, the dislodged material might tend to accumulate and be compressed in the cavity or recess 29 defined between adjacent ribs 25. If such occured and there was sufficient build-up of accumulated material, it would in effect provide a continuous uninterrupted surface on the sleeve 21 and tend to negate the breaker effect which is desired. However, due to the inherent flexibility and resiliency of the elastomeric ribs 25, the ribs will tend to deform and be displaced slightly under load to discourage the accumulation of bulk material in the recesses 29 as well as to cause break-away or dislodgement of any such material which would tend to accumulate.

The resilient gripping action of the interior surface 30 of the sleeve 21 is relied upon for effecting securement of the sleeve to the roller body 22. The inner diameter or cross-sectional area of the un-tensioned or un-stressed sleeve is purposefully made smaller than the external diameter or peripheral cross-sectional area of the roller body 22 so that the sleeve will be stretched or stressed when mounted on the body to effect the desired gripping securement without the necessity for or the aid of other fastening or bonding means. Within reasonable limits, the gripping action of the sleeve is greater and more effective in proportion to the difference in size between the sleeve 21 and the roller body 22. However, as the differential in size increases it becomes progressively more difficult to expand the sleeve sufficiently to enlarge it for mounting it on the body of the roller. It has been found that with the wear-resistant elastomers which are commercially suitable for use in the manufacture of the sleeve 21, effective gripping securement of the sleeve on the roller body can be accomplished with relative ease of mounting by limiting the size differential between the sleeve and the roller body to less than 10 percent of the diameter or size of the roller body. For example, if the roller body has an external diameter of 5 inches, a tubular sleeve will be provided having an internal diameter which is less than 5 inches but not less than 4.5 inches. The preferable maximum size differential of 0.5 inches being 10 percent of the five inch diameter of the roller.

In operation, as the return flight 18 of the belt rides upon and rotates the idler rollers, the projections or ribs 25 are successively and intermittently brought into deforming engagement with the surface of the return flight of the belt to separate the belt surface from any adherent or encrusted residue of material thereon and to cause said material to be separated and discharged from the belt. This intermittent deformation or flexing of the belt also serves to prevent and break up ice accumulations on the surface which might form during freezing weather and prevent operation of the conveyor. As the projections 25 wear down during operation and use, they will eventually become so short as to be ineffective for the purpose intended. When this occurs, the worn sleeve 21 is removed from the roller body 22 and is replaced by a new sleeve to completely rehabilitate the wear surface of the roller. Although the sleeve is extremely durable and wear-resistant, it is not as hard nor as rigid as steel or other similar metals, but it is more resistant to corrosion and chemical action than steel or other ordinary metals would be. As the elastomer wears, it does not form any sharp, cutting edges as is the case with the metal breaker rollers of the prior art. Therefore, there is no injury resulting to the belt from the wear on the sleeve and a worn sleeve can be used without damage to the belt as long as the projections 25 are of sufficient height to accomplish their purpose.

Figure 4:
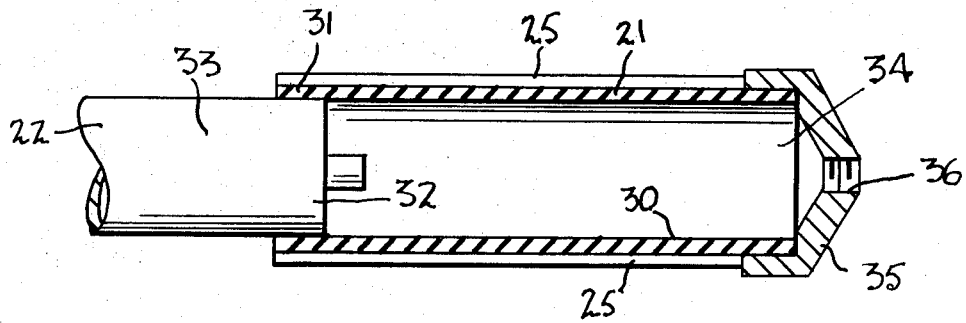
FIG. 4 is a cross-sectional view illustrating one method of conveniently mounting the tubular sleeve on the conveyor roller.
Figure 5:
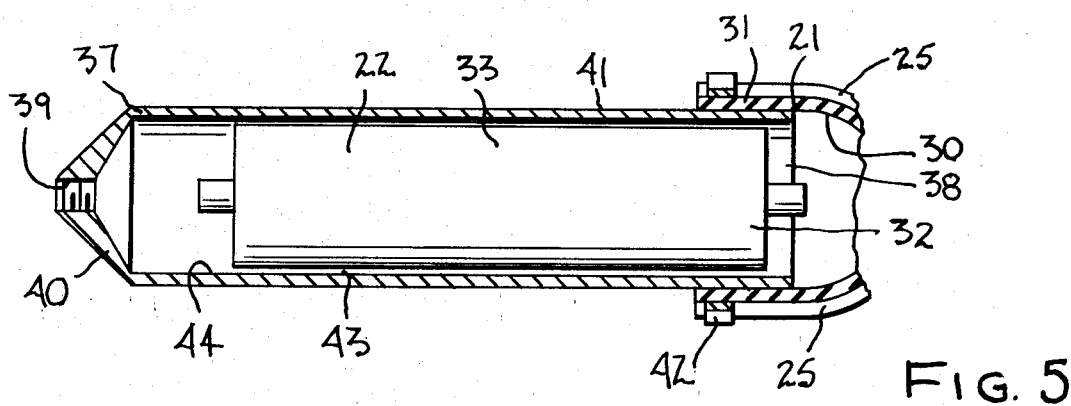
FIG. 5 is a view similar to FIG. 4 but showing another method of accomplishing the same.
Figure 6:
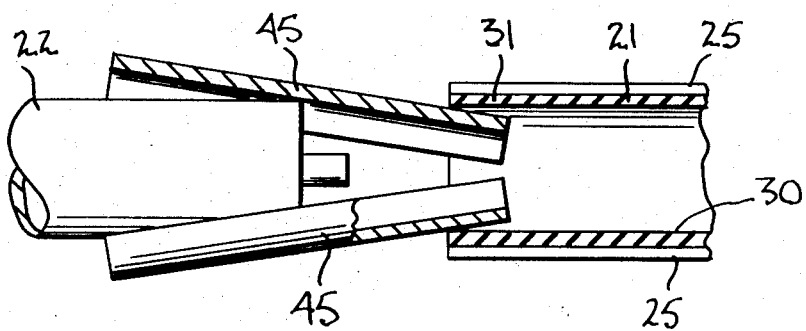
FIG. 6 illustrates one technique that can be utilized for initially expanding the end of the tubular sleeve to move it over the end of the roller.

Although there may be circumstances or conditions, such as an extremely short length of roller or an extremely resilient material used for the sleeve or only a very slight differential in size between the sleeve and the roller body, which might make it feasible to simply slide the sleeve manually onto the roller to the desired position, such circumstances or conditions would be the exception rather than the rule. For that reason, techniques and aids for installation or mounting of the sleeve on the roller are desirable and are illustrated in FIGS. 4, 5 and 6 of the drawings. As shown in FIG. 4, one end 31 of the tubular sleeve 21 is stretched or expanded to a sufficient extent that it can be slidably moved into overlying relationship to or engagement with the peripheral surface of an end portion 32 of the roller body 22. When this end 31 of the sleeve is permitted to contract, its inner surface 30 engages the surface 33 of the roller body to create a barrier or seal against fluid flow. The other open end 34 of the sleeve is temporarily sealed or capped as by a suitable fitting 35 having an aperture or port 36 provided therein for introducing fluid under pressure to the closed chamber defined by the un-expanded portion of the tubular sleeve.

As the roller body 22 is held in its sleeve-engaging position, the sleeve expands or stretches in response to the fluid pressure so that it becomes of sufficient size to permit the roller to be slidably inserted therein until the sleeve is positioned fully over the roller. During the pressure build-up, the sleeve will ordinarily expand to a dimension which will open the previously described fluid flow seal or barrier and permit some escape or discharge of the fluid between the previously engaged surfaces 30 and 33. By controlling the pressure build-up within the sleeve, the extent and volume of this fluid discharge from the end 31 of the sleeve can be regulated, if necessary or desirable. The fluid discharge between the surfaces 31 and 33 provides an anti-friction cushion between the roller and sleeve which permits relatively free axially-directed insertion of the roller to its final position within the sleeve. When this position is reached, the fluid pressure can be relieved and the sleeve will contract into resilient gripping securement with the roller. Upon removal of the fitting 35, the roller is ready for installation and operative use.

In FIG. 5, a modified form of installation method is illustrated in which the roller is initially inserted or nested within a rigid hollow cylinder 37 which is open at one end 38 and is provided with a fluid entrance port 39 at its opposite end 40. In lieu of mounting the one end 31 of the sleeve directly onto the roller surface, as in the method of FIG. 4, this end 31 is expanded sufficiently to permit it to overlie the outer surface 41 of the cylinder adjacent the open end 38 thereof. A clamp 42 or other suitable means is used to maintain the connection between the ends of the cylinder and sleeve in the relationship shown in FIG. 5 so that a fluid flow barrier or seal is created between the interior surface 30 of the sleeve and the exterior surface 41 of the cylinder.

When fluid under pressure is introduced into the cylinder 37 through the port 39, the build-up of the pressure on the adjacent end plate surface 23 causes the roller to advance axially toward the unexpanded portion of the sleeve 21 until it engages and effects a fluid seal with the interior surface 30. However, there is an annular clearance space 43 between the roller surface 33 and the internal surface 44 of the cylinder 37. This clearance space may be on the order of a few thousandths of an inch but is sufficient to permit the fluid under pressure to flow through the clearance space 43 and create a pressure build-up at the point where the end portion of the roller engages the interior surface 30 to create the fluid flow seal.

The pressure builds up sufficiently to open the seal and cause progressive expansion of the unexpanded portion of the sleeve as the roller advances axially into the sleeve. That portion of the fluid which passes between the surfaces 30 and 33 as the roller advances, forms an anti-friction cushion as in the method previously described, and discharges through the opposite open end of the sleeve. When the roller has been fully inserted into the sleeve, the clamp connection 42 is released, the cylinder 37 is withdrawn from the sleeve and the fluid pressure is relieved so that the sleeve contracts into resilient gripping engagement with the surface 33 of the roller body. The roller is now provided with a new operational belt-contacting surface and is ready for installation and use.

It will be noted that in the described method of FIG. 4, the roller is axially inserted into the sleeve in opposition to the force exerted by the pressure fluid. Inasmuch as relatively low fluid pressures can be effectively employed for this installation method, the counter-insertion force of the fluid pressure is not a significant factor to contend with when the area of the end plate 23 of the roller is relatively small. With larger rollers, the end plate area can reach a value where even relatively low fluid pressures exert a considerable force upon the roller in opposition to its insertion into the sleeve. The method illustrated in FIG. 5 of the drawings, overcomes this condition by utilizing the fluid pressure both for causing insertion displacement of the roller as well as expansion of the sleeve. Thus there is no fluid pressure force in opposition to the inserting movement, as there is in the method of FIG. 4. For that reason, the method of FIG. 5 is preferred, particularly for the larger sizes of rollers.

Any suitable fluid, either liquid or gas, can be utilized in the above-described mounting methods. Conveniently, either compressed air or water under pressure are readily available at the sites where the tubular sleeves would be replaced or initially mounted on the rollers.

FIG. 6 of the drawings shows a method or technique which can be utilized for initially expanding the end 31 of the sleeve so that it can be initially positioned for either of the mounting methods previously described. A pair of levers 45, preferably of arcuate configuration, are partially inserted into the end 31 of the tubular sleeve. The remainder of each lever rests upon the end of the surface 33 of the roller body which provides a fulcrum point for the pair of levers. As the free ends of the levers are drawn toward each other, the end portion of the sleeve is stretched or expanded sufficiently so that it can be drawn over the end portion of the roller body 22 or of the cylinder 37, as the case may be. It will be understood that when the mounting method of FIG. 5 is utilized the lever arms would be used in association with the cylinder 37 instead of directly with the roller. The expanded end portion of the tubular sleeve can then be moved over the end portion of the body with which it is to be connected for mounting purposes. The levers are then withdrawn and one of the described mounting methods is utilized.

For a cylindrical roller, the cross-section of each of the levers 45 may be substantially semi-circular so that the end of the sleeve which is to be expanded by the levers will be fairly fully engaged over a substantial portion of its interior surface by the combination of levers. Similarly, other conforming configurations of the lever can be utilized where non-cylindrical rollers are used. Additionally, if the pair of levers 45 is to be used for a single purpose, that is for a single size and configuration of roller, it will be understood that it might be desirable to use a pivoted connecting link for uniting the separate levers 45 into a single expansion tool.

It is to be understood that the forms of my invention, herewith shown and described, are to be taken as preferred examples of the same, and that various changes in the shape, size and arrangement of parts may be resorted to, without departing from the spirit of my invention, or the scope of the subjoined claims.

Having thus described my invention, I claim:

1. A method of mounting a resilient tubular sleeve of elastomeric material on a closed-end conveyor roller whose external diameter is greater than the un-stressed internal diameter of said sleeve, comprising the steps of:
    a. Slidably nesting said closed-end conveyor roller into a close-fitting hollow cylinder to provide a restricted fluid flow annular passageway around said roller,
    b. Expanding one end of said sleeve sufficiently to mount it in coupled relationship to an open end portion of said cylinder,
    c. Injecting fluid under pressure into the opposite end of said cylinder to displace said roller into sealing engagement with the unexpanded portion of said sleeve to create a fluid barrier,
    d. Maintaining said fluid pressure to cause fluid flow through said annular passageway to progressively open said barrier and expand the remainder of said sleeve while displacing said roller by said fluid pressure into said expanded remainder until said roller has attained and desired positional longitudinal relationship to said sleeve, and
    e. Relieving said pressure to permit said sleeve to contract into gripping relationship to said roller.

* * * * *